United States Patent [19]

Leonard

[11] Patent Number: 5,235,746
[45] Date of Patent: Aug. 17, 1993

[54] METHOD OF MANUFACTURING A HIGH-CAPACITY SERVO VALVE BODY

[75] Inventor: Marc B. Leonard, Cypress, Tex.

[73] Assignee: Atlas Fluid Controls Inc., Houston, Tex.

[21] Appl. No.: 853,568

[22] Filed: Mar. 19, 1992

[51] Int. Cl.⁵ .............................................. B23P 15/00
[52] U.S. Cl. .................................. 29/890.128; 29/558; 29/890.126; 29/890.132; 137/625.69
[58] Field of Search .................... 29/890.124, 890.126, 29/890.128, 890.132, 557, 558; 137/625.66, 625.69

[56] References Cited

U.S. PATENT DOCUMENTS

| | | | |
|---|---|---|---|
| 3,103,739 | 9/1963 | Moog | 29/890.128 |
| 3,188,724 | 6/1965 | Bates et al. | 29/890.128 |
| 3,206,837 | 9/1965 | Holmes | 29/890.128 |
| 3,715,098 | 2/1973 | Baumann | 29/890.128 |
| 4,017,706 | 4/1977 | Aurbrecht et al. | 219/69 |
| 4,593,719 | 6/1986 | Leonard | 137/625.66 |
| 4,719,681 | 1/1988 | Piet | 29/890.128 |

FOREIGN PATENT DOCUMENTS

| | | | |
|---|---|---|---|
| 0008875 | 1/1983 | Japan | 29/890.128 |
| 836010 | 6/1960 | United Kingdom | 29/890.128 |
| 838839 | 6/1960 | United Kingdom | 29/890.128 |
| 1450380 | 9/1976 | United Kingdom | 29/890.128 |

OTHER PUBLICATIONS

Basic Theory, Electrical Discharge Machining; EDM Todya, May, Jun. 1991; by E. P. Guitrau.

*Primary Examiner*—Irene Cuda
*Attorney, Agent, or Firm*—William A. Knox

[57] ABSTRACT

A servo valve body is made by first boring a central cylindrical passageway, for receiving a valve spool, through an elongated, substantially rectangular valve block of tool steel. A plurality of cross slots are cut through the valve block, from one side through to the opposite side, at intervals along the length of the block, orthogonally to the axis of the passageway. The cross slots are cut by use of electronic discharge machining technology. The cross slots serve as fluid flow chambers when the cross slots are terminated by transition plates secured to the opposite sides of the valve block. The transition plates provide fluid inlet, outlet and drain ports. The valve block in combination with the transition plates comprises the servo valve body.

5 Claims, 5 Drawing Sheets

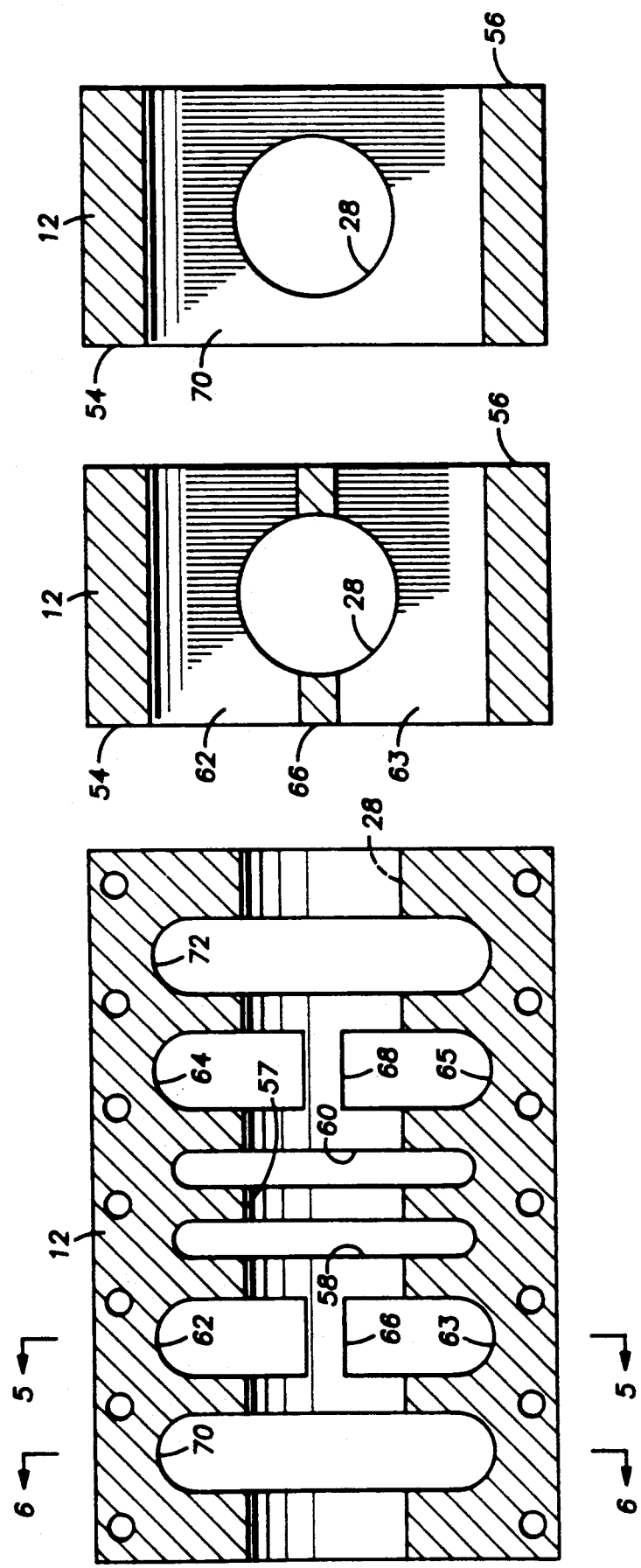

METHOD OF MANUFACTURING A HIGH-CAPACITY SERVO VALVE BODY

BACKGROUND OF THE INVENTION

1. Field of the Invention

This invention is concerned with manufacturing a high-capacity servo-valve body with the aid of wire EDM technology.

2. Discussion of the Prior Art

As is well known, servo valves are used to control devices such as seismic vibrators, linear actuators or reversible motors. Typically such valves consist of a valve body having a series of internal radially-arranged, annular flow chambers. The flow chambers are linearly disposed at selected intervals along the length of the valve body. The central flow chamber is fluidly coupled to an inlet port that may be connected to a source of pressurized fluid. The two outermost flow chambers are connected to first and second drain ports that feed into a low-pressure sump. The other two intermediate flow chambers are connected to first and second outlet ports for directing pressurized fluid to the device to be controlled. A bore, of lesser diameter than the diameter of the annular flow chambers, is machined internally along the length of the valve body, orthogonally intersecting the respective annular flow chambers. A valve spool, consisting of three or more spool-shaped lands separated by stem portions, is slidably mounted within the bore. End caps mounted at each end of the bore include drive means for reciprocating the spool valve laterally within the bore. The drive means may be electrically, hydraulically or pneumatically programmed by a pilot valve of any desired type. A linear variable displacement transducer (LVDT) monitors the position of the valve spool within the bore. Depending upon the position of the valve spool, the lands are designed to block off selected flow chambers. A typical servo valve is described in U.S. Pat. No. 4,593,719.

In operation, when the valve spool is centered, the ports are closed and no action occurs. When the valve spool is moved towards one end of the bore, the inlet port is fluidly coupled to the first fluid outlet port while the second outlet port is open to the corresponding drain port so that the controlled device will perform a function in a first direction. With the valve spool at the opposite end of the bore, the inlet port is open to the second outlet port and the first outlet port is opened to the first drain port so that the controlled device performs its function in a second direction.

In one method of construction, the servo valve body is of cast iron or steel. Fluid passageways in the casting must allow for a smooth transition in flow path between the substantially rectangular annular flow chambers and the circular inlet and outlet pipe fittings demanded by conventional plumbing components. The casting is internally complex and it is difficult to machine the septa between the flow chambers to provide fluid ports with the tolerances required by the lands on the valve spool. Furthermore, cast metals are too soft to retain the sharp shoulders on the septa that are needed for accurate fluid-flow control. Accordingly, the bore is usually honed to a desired diameter. A cylindrical sleeve of hard tool steel is provided, having a plurality of radial ports machined in its wall to communicate with the respective fluid flow chambers. The radial ports in the sleeve are dimensioned to match the lands on the valve spool. The sleeve is inserted through the bore, sealed thereto with gaskets or O-rings. The valve spool then reciprocates inside the sleeve. Alternatively, the sleeve may be inserted and sealed in place using heat-shrink technology. The assembly tends to be bulky because the fanout from the flow chambers to the circular plumbing connections takes up considerable space.

For small servo valves of relatively low capacity that are manufactured in quantity, the above method of manufacture is economical. For large valves that need to be custom-made in only one or two copies, creation of the required molds for casting the valve body is extremely complex and expensive. This invention provides a method for economically making a precision servo valve body that is compact, simple of construction and assembly and that does not requires special castings or sleeves.

SUMMARY OF THE INVENTION

In accordance with this invention, an elongated generally rectangular valve block of a selected material is provided. The valve block includes two end portions and opposite side portions. A central cylindrical passageway, adapted to receive a valve spool, is bored lengthwise through the center of the valve block between the two end portions. At selected intervals along one side portion of the valve block, a plurality of pilot holes are drilled through the valve block from one side portion to the opposite side portion. An electrode wire is inserted through a first pilot hole. An oblong cross slot is cut through the valve block orthogonally to the central passageway by electrical discharge machining technology. The process is repeated for the remaining pilot holes. The respective oblong cross slots are designated as fluid inlet, fluid drain and fluid outlet flow chambers.

A first transition plate is secured to a first side of the valve block over the oblong cross slots. The first transition plate is adapted to block those flow chambers designated as fluid outlet flow chambers and to provide fluid communication between the designated fluid inlet and fluid drain flow chambers and a source of pressurized fluid and a fluid sump respectively. A second transition plate is secured to the opposite side of the valve block. The second transition plate is adapted to block those chambers designated as fluid inlet and fluid drain flow chambers and to provide fluid communication between the designated fluid outlet chambers and a device to be actuated.

In a preferred embodiment of this invention, the valve block is made from heat-treated tool steel and the transition plates are made from mild steel.

BRIEF DESCRIPTION OF THE DRAWINGS

These and other benefits of this invention will be better appreciated by reference to the detailed description of the preferred embodiment and the drawings wherein:

FIG. 4 is a cross section along 4—4 of FIG. 2;

FIG. 5 is a cross section along 5—5 of FIG. 4;

FIG. 6 is a cross section along 6—6 of FIG. 4;

FIG. 8 is a cross section along lines 8—8 of FIG. 7a;

DETAILED DESCRIPTION OF THE PREFERRED EMBODIMENT

Figure 1:
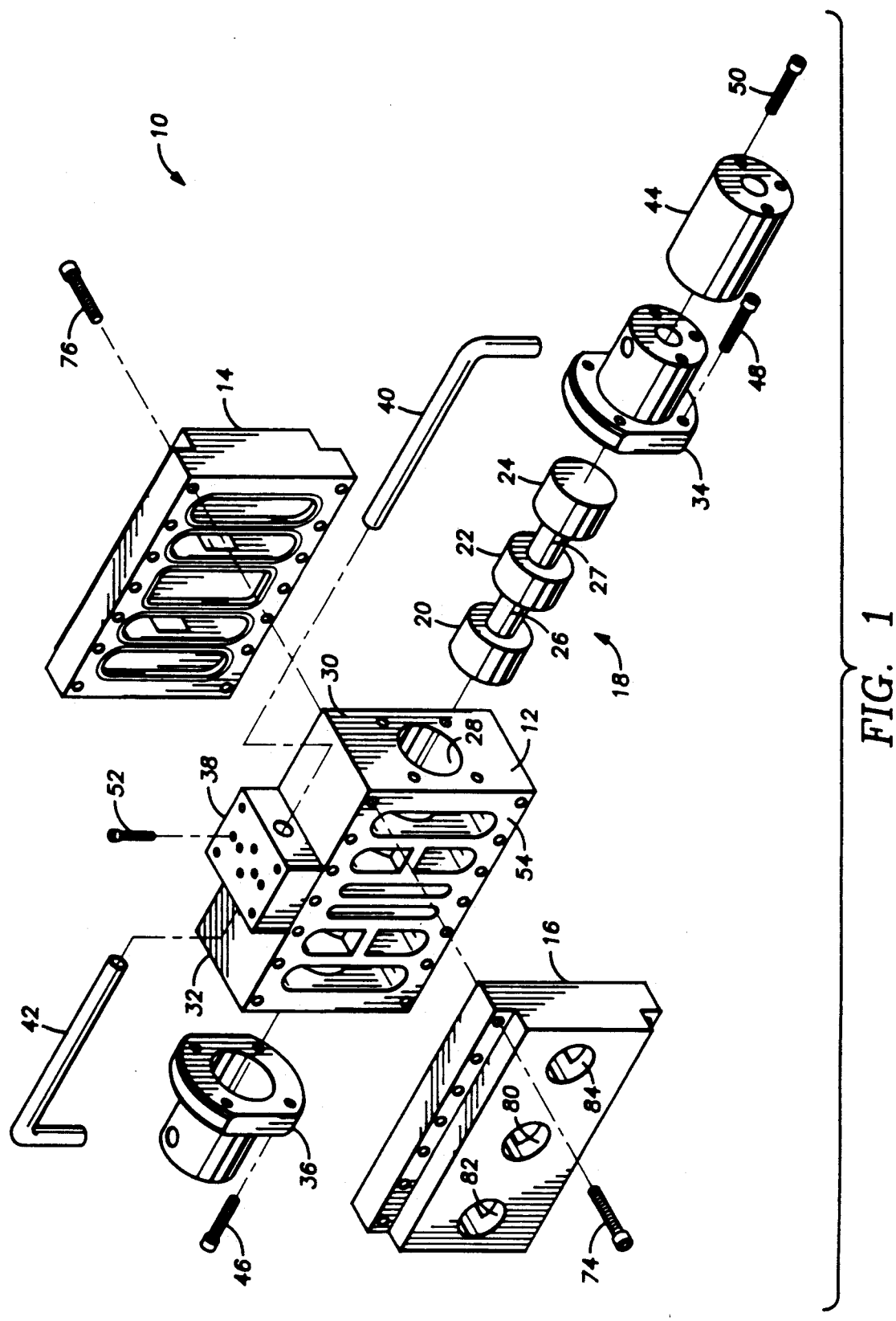
FIG. 1 is an exploded view of the essential parts of the servo valve body.

An exploded view of a servo valve assembly, generally shown as 10, is exhibited in FIG. 1. The servo valve assembly 10 includes a valve block 12 of generally rectangular shape and right and left transition plates 14 and 16. A valve spool 18 having lands 20, 22, 24 separated by stem portions 26 and 27 fits slidingly in passageway 28 that is bored lengthwise through the valve block 12 between end portions 30 and 32. End caps 34 and 36, which are normally bolted to end portions 30 and 32 respectively, provide drive means for reciprocating valve spool 18. A pilot valve of any well known type (not shown) may be mounted atop pilot-valve block 38. Hydraulic lines 40 and 42 deliver hydraulic control fluid from a pilot valve to the valve spool. The valve spool could, of course be electrically or pneumatically controlled. An LVDT 44 is used to monitor the position of valve spool 18. Bolts such as 46, 48, 50 and 52 may be used to fasten the respective parts in place. It is to be understood that the valve spool, end caps, LVDT and pilot valve block are included in the drawings for completeness but form no part of this invention in and of themselves.

Figure 2:
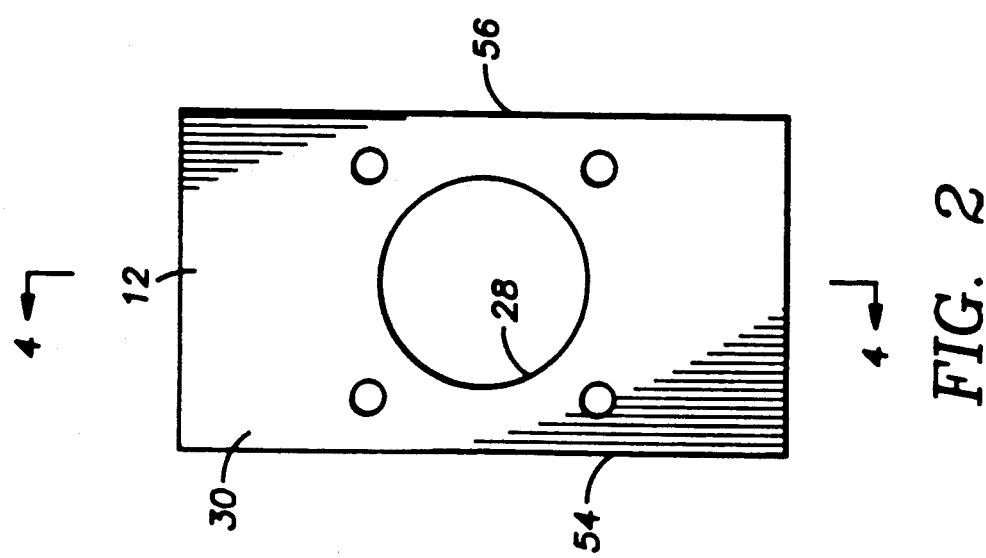
FIG. 2 is an end view of the valve block of FIG. 1.

FIG. 2 is an end view of valve block 12 showing passageway 28 and end portion 30. Valve block 12 includes opposite side portions 54 and 56.

Figure 3:
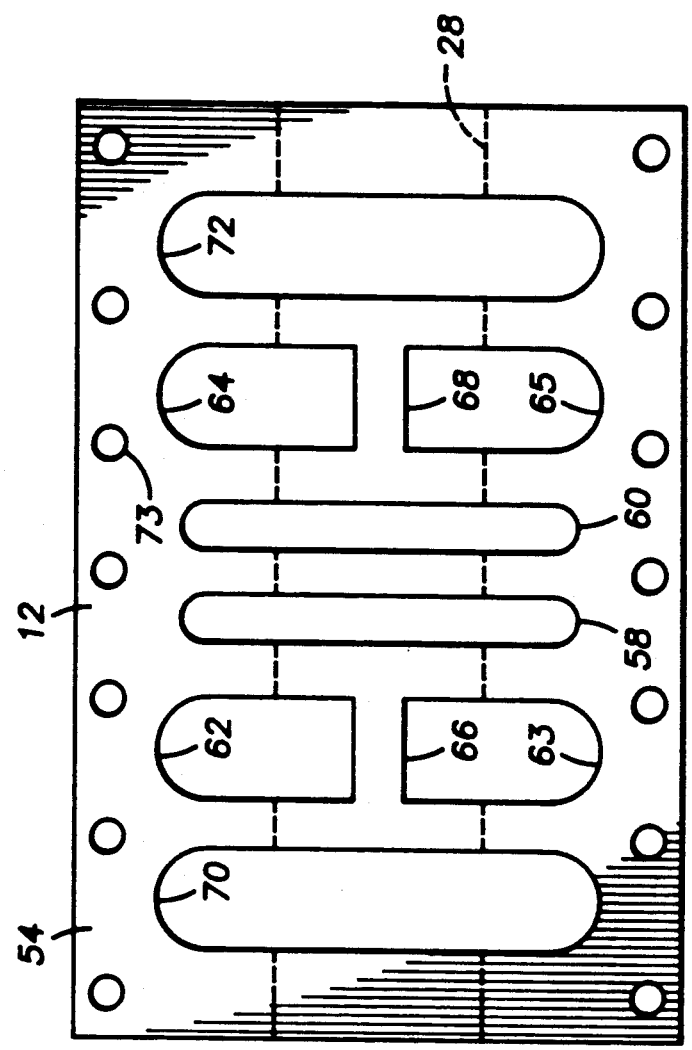
FIG. 3 is a side view of a preferred form of the valve block of FIG. 1.

FIG. 3 is a side view of valve block 12, showing the left-hand side portion 54. Six oblong cross slots are cut through valve block 12 from one side 54, through to the opposite side 56, orthogonally to passageway 28 (shown as dashed lines in FIG. 3). Cross slots 58 and 60, combined, form a bifurcated inlet flow chamber. Cross slots 58 and 60 could be combined into a single aperture but the format shown is preferred for reasons to be explained under FIG. 4. The outlet flow chambers are formed by cross slots 62 and 63, 64 and 65. The bridges 66 and 68 are provided for structural integrity. Cross slots 70 and 72 serve as drain fluid flow chambers. For engineering design reasons, the cross slots are shown with rounded ends although square ends could be used. A series of tapped holes such as 73 are provided for securing the transition plates 14 and 16 (FIG. 1) to valve block 12 as will be disclosed later. It is to be understood that the drain and inlet fluid flow chambers could be interchanged if desired.

FIG. 4 is a cross section of valve block 12 along line 4—4 of FIG. 2. Cross slots 58–64 and 70, 72 are shown along with passageway 28. Bridges 66 and 68, as before stated, are provided for structural integrity. The septum 57 between apertures 58 and 60 is designed to provide support for the center land 22 of valve spool 18 of FIG. 1 when the valve spool is inserted into passageway 28. Absent the need for such support, the two cross slots 58 and 60 could be combined into a single cross slot of a size comparable to slots 70 or 72.

FIG. 5 is a cross section along line 5—5 of FIG. 4 showing the arrangement of the bridge 66 with cross slot 62 being cut through valve block 12 from a first side 54 to the opposite side 56 orthogonally to passageway 28.

FIG. 6 is a section along line 6—6 of FIG. 4, showing the configuration of cross slot 70.

Preferably, the valve block blank is made from a selected material such as tool steel. Initially in the manufacturing process, passageway 28 is bored out by any desired means. Thereafter, the respective bolt holes as shown in the Figures are drilled and tapped as required. Next, a series of pilot holes are drilled through the valve block blank from one side through to the other side. The pilot holes are positioned laterally along the blank at a convenient place within the outlines of the cross slots at each of the desired cross-slot locations. The valve block blank in then heat treated and hardened. If slight shrinkage or distortion occurs following the hardening process, passageway 28 may subsequently be honed to precise dimensions as needed.

It is preferred to cut the respective cross slots precisely to size using wire electronic discharge machining (EDM) technology. This process is done following the heat treatment to avoid possibility of distortion of the slots which would occur if the EDM operation had been done previous to the heat treatment. Using EDM, a wire electrode is inserted in turn, through each one of the previously-drilled pilot holes. The electrode is programmed to precisely cut through the valve block blank around the desired outline of each cross slot. The residual metal slug that is cut away then drops out from the workpiece. In effect, wire EDM is an electronic band saw where the saw blade is a thin, consumable, moving-wire electrode that never actually touches the workpiece. The metal removal mechanism is one of vaporizing small volumes of the workpiece instead of the cutting or grinding processes used in conventional machine shop practice. Using wire EDM, very precise cuts of great complexity may be made that have a smooth final finish which needs no further honing or grinding. Wire EDM processing is capable of cutting speeds of 15 to 20 square inches per hour even with very hard materials such as tungsten carbide.

An article from EDM Today, entitled Basic Theory, Electrical Discharge Machining, May, Jun., 1991, by E. P. Guitrau, discusses the general principles of EDM technology. U.S. Pat. No. 4,017,706 teaches a method for machining the air gaps of a torque motor assembly using precisely-dimensioned, solid-electrode technology.

The oblong cross slots that are cut through the valve block will form fluid flow chambers when left and right hand transition plates 16 and 14, FIG. 1 are bolted to the side portions 54 and 56 of valve block 12. The transition plates provide smooth flow from the oblong cross slots to the circular connections usually associated with hydraulic plumbing.

Figure 7A:
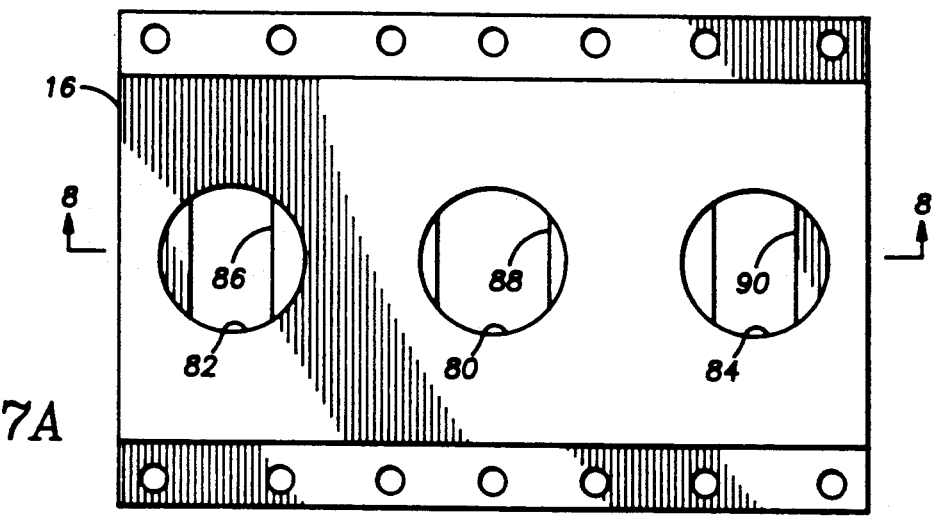
FIG. 7a is a view of one face the left hand transition plate as seen from FIG. 1.

FIG. 7a is a detailed view of left hand transition plate 16 as seen in FIG. 1 showing inlet port 80 and fluid drain ports 82 and 84. The ports are circular for connection to standard hydraulic plumbing fittings.

Figure 7B:
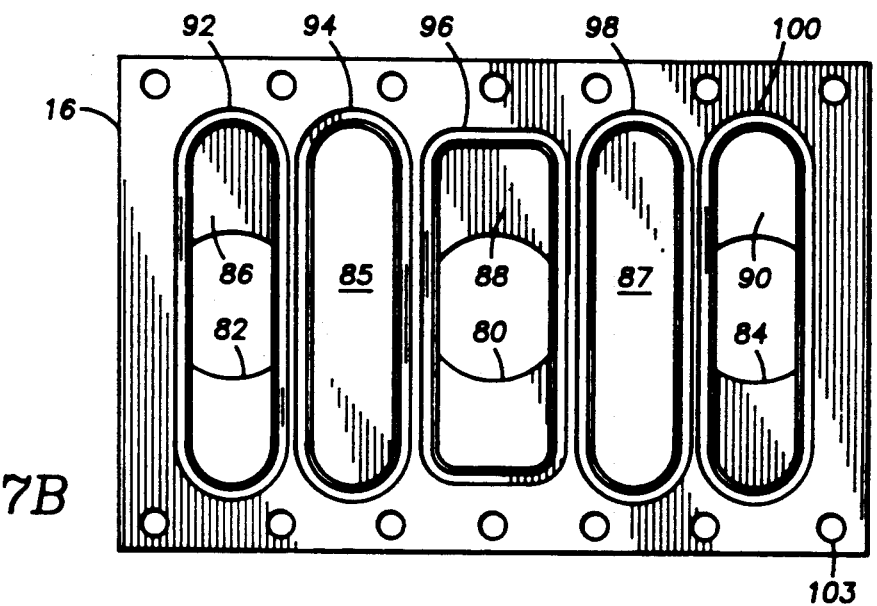
FIG. 7b is a view of the opposite face of the left hand transition plate that is hidden from view in FIG. 1.

FIG. 7b shows the details of the face of transition plate 16 that is hidden in FIG. 1 and which abuts side portion 54 of valve block 12 when secured thereto. Transition slots 86 and 90 mate with cross slots 70 and 72 respectively, FIG. 3, to provide fluid flow from the cross slots to the two drain ports 82 and 84. Transition slot 88 directs fluid flow from inlet port 80 to both cross slots 58 and 60 which together form the bifurcated inlet fluid flow chamber. Regions 85 and 87 are blanks that seal off the outlet fluid flow chambers 62, 63, 64, and 65. O-ring grooves 92, 94, 96, 98, 100 are provided as shown.

Figure 8:
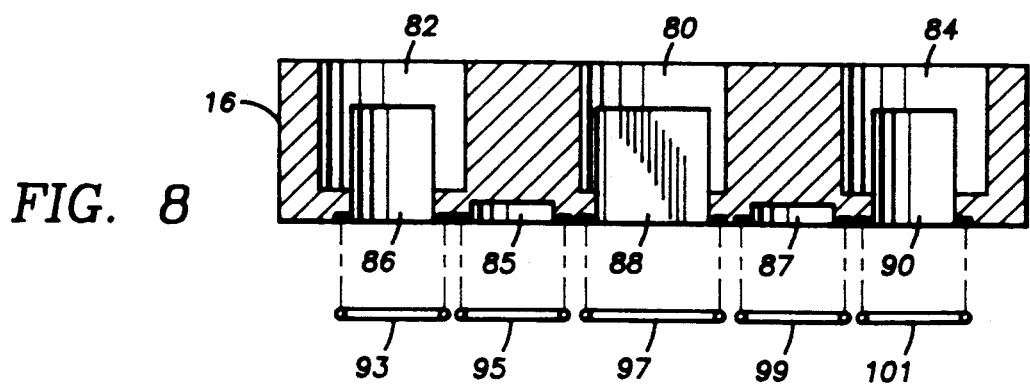

FIG. 8 is a cross section along line 8—8 of FIG. 7b. Shown are the circular inlet and drain ports 80, 82 and 84 as well as the transition slots 86, 88, and 90. O-rings 93, 95, 97, 99 and 101 fit into the corresponding grooves 92, 94, 96, 98 and 100 to provide fluid seals when the transition plates are bolted to side portion 54 of valve block 12 by a plurality of bolts such as 74, FIG. 1, through bolt holes such as 103.

Figure 9A:
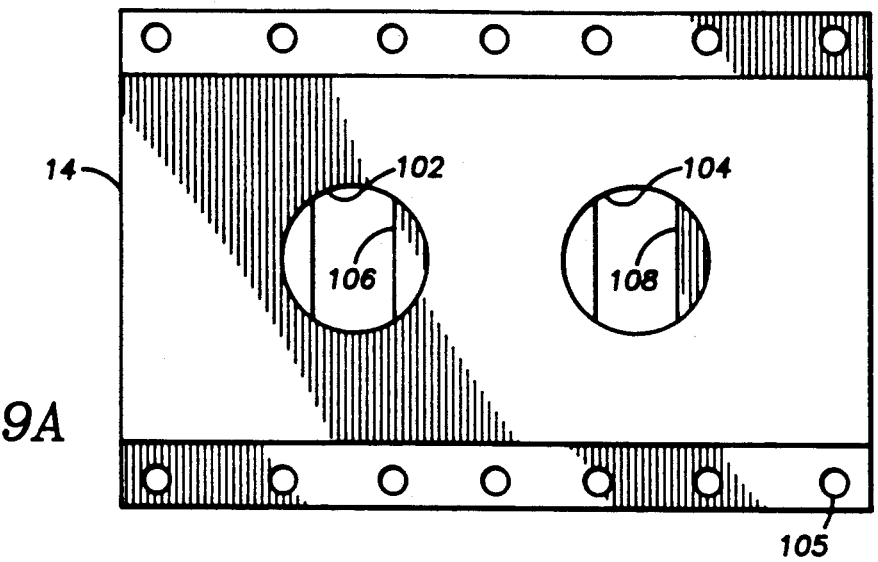
FIG. 9a is a view of the face of the right hand transition plate that is hidden from view in FIG. 1.

FIG. 9a is a view of transition plate 14 as would be seen from the face that is hidden in FIG. 1, showing outlet ports 102 and 104 which are circular for receiving standard hydraulic fittings.

Figure 9B:
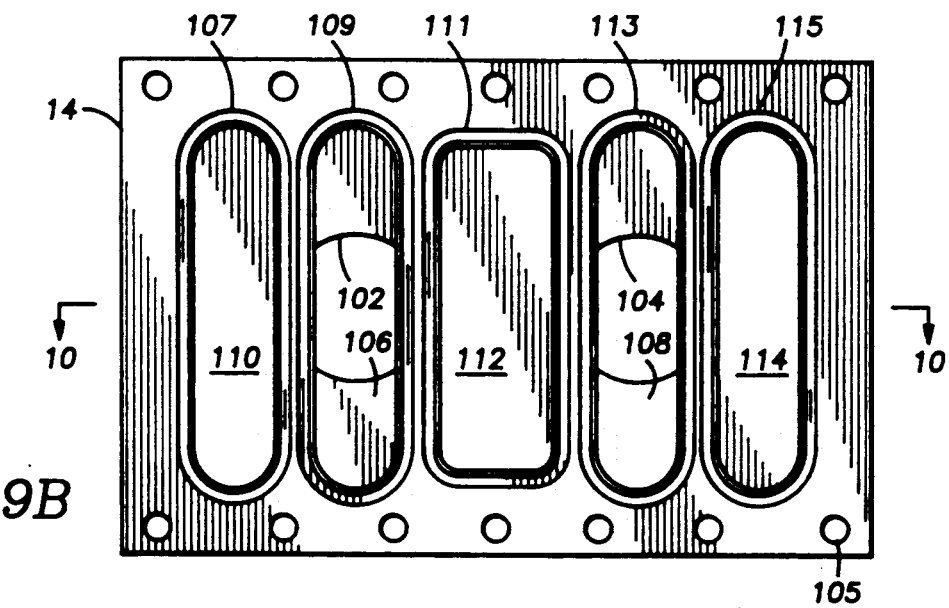
FIG. 9b is a view of the face of the right hand transition plate as seen FIG. 1.

FIG. 9b is a detailed view of the face of transition plate 14 as seen in FIG. 1 and which abuts side portion 56 as indicated in FIG. 2, of valve block 12. Transition slots 106 and 108 provide fluid flow from cross slots 62, 62 and 64, 65, FIG. 3, to outlet ports 102 and 104. Blanks 110, 112, 114 block flow from cross slots 70, 72, 68 and 60. O-ring grooves 107, 109, 111, 113 and 115 are cut around the transition slots 106 and 108 as well as around blanks 110, 112 and 114 to furnish fluid seals when transition plate is bolted to side portion 56 of valve block 14 by bolts such as 76 which are inserted through bolt holes such as 105.

Figure 10:
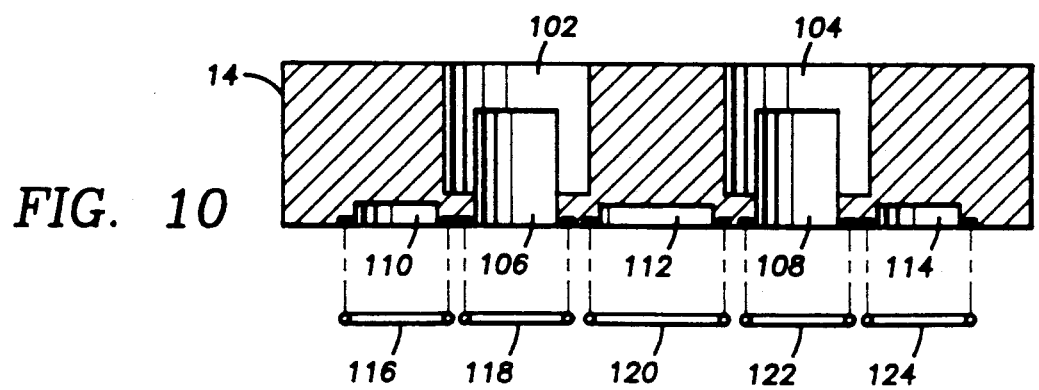
FIG. 10 is a cross section along lines 10—10 of FIG. 9b.

FIG. 10 is a cross section along line 10—10 of FIG. 9b, showing transition slots 102 and 104, outlet ports 106 and 108 and blanks 110, 112 and 114. O-rings 116, 118, 120, 122 and 124 fit into the corresponding O-ring grooves 107, 109, 111, 113, and 115 respectively as shown in FIG. 9b.

It is preferred that the transition plates 14 and 16 be made of mild steel. The transition slots, the various inlet, outlet and drain ports and the O-ring grooves may be formed by conventional machine shop operations such as milling and boring.

The best mode of manufacture has been disclosed in the previous paragraphs. In assembling the servo valve as a whole, following completion of the valve block, the transition plates are bolted thereto as previously indicated. The valve spool is inserted into passageway 28 and the end caps 34 and 36 and LVDT 44 are bolted in place. Hydraulic control lines 40 and 42 are connected between pilot valve block 38 and end caps 34 and 36.

It will be appreciated that the basic servo valve body that is the subject of this invention is very simple, consisting of but three parts that may be easily assembled and disassembled for maintenance as required. For example, valve block 12 can easily be replaced without disturbing the transition plates and their associated hydraulic plumbing fixtures.

The shapes of the valve body components as illustrated are exemplary only. For example, valve block 12 could be designed with an integral mounting pedestal at its base, rather than being substantially rectangular as shown. The transition plates may each be formed from a single block of cold rolled steel or other material or they could be cast. Other variation will doubtless be conceived of by those skilled in the art but which will fall within the scope and spirit of this invention which is limited only by the appended claims.

What is claimed is:

1. A method of manufacturing a servo valve body comprising:
   providing an elongated generally rectangular valve block of a selected material, said valve block having two end portions and opposite side portions;
   boring a central cylindrical passageway lengthwise through said valve block between said end portions, said passageway being adapted to receive a valve spool;
   at selected intervals along one side portion of said block, drilling a plurality of pilot holes through said block to the opposite side portion thereof;
   inserting an electrode wire through a first pilot hole and, using wire electronic discharge machining technology, cutting an oblong cross slot through said valve block to the opposite side portion thereof, said cross slot being oriented orthogonally to said passageway; and
   repeating the steps of wire-electrode inserting and cross-slot cutting for the remaining pilot holes, thereby to provide a plurality of cross slots which are designated as inlet, outlet and drain fluid flow chambers.

2. The method as defined by claim 1, comprising:
   securing a first transition plate to a first side portion of said valve block over said oblong cross slots, said first transition plate being adapted to block those cross slots that are designated as outlet fluid flow chambers and to provide fluid communication between the cross slot designated as an inlet fluid flow chamber and a pressure source and to establish fluid communication between those cross slots designated as fluid drain chambers and a sump; and
   securing a second transition plate to the opposite side portion of said valve block over said oblong cross slots, said second transition plate being adapted to block those cross slots designated as inlet and drain fluid flow chambers and to provide fluid communication between the cross slots designated as outlet fluid flow chambers and a device to be actuated.

3. The method as defined by claim 2 wherein:
   said valve block is manufactured from tool steel; and
   said first and second transition plates are manufactured from mild steel.

4. The method as defined by claim 1, comprising;
   following steps of boring and drilling, heat-treating and hardening said valve block prior to the steps of inserting and cutting.

5. The method as defined by claim 1 wherein:
   said pilot holes are positioned laterally along the valve block at desired places within the outlines of the cross slots at each of the preselected cross-slot locations.

* * * * *